UNITED STATES PATENT OFFICE.

MERRIWEATHER J. WAUGH, OF LINCOLN, NEBRASKA.

PAINT.

981,902. Specification of Letters Patent. Patented Jan. 17, 1911.

No Drawing. Application filed June 21, 1910. Serial No. 568,101.

*To all whom it may concern:*

Be it known that I, MERRIWEATHER J. WAUGH, a citizen of the United States, residing in Lincoln, Lancaster county, Nebraska, have invented certain new and useful Improvements in Paints, of which the following is a specification.

Paints as now made and used have not the requisite elasticity and adhesiveness necessary to compensate for the expansion and contraction of wood or iron to which they are applied, due to the varying climatic conditions, thus causing the paint coat to split into small squares—a failure usually called "checking."

It is the essential object of this invention to produce a paint of requisite physical and chemical body to withstand such temperature changes, the paint having a maximum of elasticity and adhesive power corresponding substantially with that of the expansion and contraction of the painted surface, thus rendering the same climate proof.

An important feature of this improved climatic paint is that the same basic formula can, by regular modifications, be especially adapted for distribution throughout sections of varied climates. In arid climates the chief destructive agencies are sunlight and excessive heat, together with frequent abrupt temperature changes which cause serious movements of the painted surface by contraction and expansion. In order to compensate for this, it is evident that a paint subject to these actions must be of maximum elasticity and adhesive power. In humid climates the paint coat is always provided with a sufficient amount of moisture to prevent its becoming either brittle or hard, and the difficulty under these circumstances is to maintain the coat of sufficient hardness to prevent its becoming fouled by dust or bruised by wear. (See co-pending applications Serial Nos. 568,531; 568,532; 568,646; and 568,989.)

This invention consists primarily in the establishment of means of making a controllable paint coat of heterogeneous chemical and physical structure. A coarse pigment of chemically stable character and crystalline structure is employed to furnish points for capillary action, for giving a coat of sufficient thickness. To fill the spaces between these coarse particles, pigments of great fineness are added, both for the purpose of shielding the easily destroyed linoxin (dried linseed oil) from atmospheric action, and to render this oil coat impermeable by gases and moisture. A further function of these fine pigments is to give hiding power or opacity to the paint. It has been found particularly desirable, in this connection, to employ sublimed white lead for the major pigment, since it is not only an exceedingly fine grained material (diameter of particle 1/35000 inch) but, in addition, it is of great chemical stability. The lead carbonate pigments, either corroded, precipitated or mild process, are all active saponifying agents, yielding a paint coat of short life and brittle or crumbly character on weathering, the compounds resultant from this action being subject to contraction, which causes the coat to split or "check." For general exterior use it is necessary to employ a hardening agent in the coat, because the coat made with sublimed white lead or other lead pigment alone is physically too soft to withstand abrasion. This hardness can be secured by the addition of a varnish resin or gum, but more satisfactorily and with greater permanence by the employment of zinc oxid. In the manufacture of this improved climatic paint it has been found that the use of fibrous magnesium silicate in the form, preferably, of comparatively long hairlike crystals of asbestos is desirable since it tends to remain in suspension and to keep the pigments likewise in suspension. A blend of fine pigments with pigments of moderately angular crystallinity is the only mix so far found which brushes uniformly. This characteristic is of considerable commercial importance, and it is to secure a proper modification of this brushing character that the fourth pigment is added in the practice of this invention. The fourth pigment referred to is a matter for selection, the essential being that it should be crystalline with rather obtuse angles, it having been shown that materials of acute angular fracture, as quartz or flint, exert too much of a retarding or holding influence on the brush, thus making the labor of application excessive. The available materials are as follows: Calcite (calcium carbonate), talc (a tubular magnesium silicate), china clay or kaolin (hydrated aluminum silicate), barytes (native barium sulfate), aragonite and other forms of calcium carbonate, (a special significance is claimed for calcium carbonate, in that it is generally believed that it has the power of neutralizing the free acids existing in the oil,) plaster-of-paris (anhydrous calcium sulfate), dolomite and other mixed carbonates, feldspar and other complex silicates.

The following formulæ are tabulated for the various climatic conditions, to-wit:

*Formula No. 1.—Normal.*
| | |
|---|---|
| Zinc oxid | 18.25% |
| Sublimed white lead | 71.00% |
| Fibrous magnesium silicate | 7.75% |
| A fourth pigment | 3.00% |

*Formula No. 2.—Humid.*
| | |
|---|---|
| Zinc oxid | 30% |
| Sublimed white lead | 60% |
| Fibrous magnesium silicate | 7% |
| A fourth pigment | 3% |

*Formula No. 3.—Dry.*
| | |
|---|---|
| Zinc oxid | 15% |
| Sublimed white lead | 72% |
| Fibrous magnesium silicate | 9% |
| A fourth pigment | 4% |

*Formula No. 4.—Arid.*
| | |
|---|---|
| Zinc oxid | 10% |
| Sublimed white lead | 75% |
| Fibrous magnesium silicate | 10% |
| A fourth pigment | 5% |

An analysis of the foregoing formulæ discloses that one or more pigments of coarse grain are employed to give a requisite thickness of coat; that two pigments of extreme and uniform fineness of grain are employed to give opacity and impermeability, as well as elasticity and durability, these being adjusted to control the hardness of the coat; that an added crystalline material is utilized to modify brushing; that a selection of materials is made to avoid destructive reaction by the pigments upon the oil; and that the same is a mix of non-poisonous character.

It is highly desirable in paint which is packed ready for use to employ materials which will remain in suspension throughout the fluid portion of the mix. If this point is not observed, the paint can, when opened, contains two layers, the first, or lower layer, being often a hard, tough bed of pigments, very difficult to disintegrate by stirring. This separation, as indicated, is very objectionable, because if the can is in any way pierced or ruptured the fluid portion can escape therefrom, while if a highly viscous condition of a mixed paint exists throughout the contents of the can a small opening does not allow the material to leak. Lead carbonate, being a pigment of high specific gravity and comparative coarseness, settles to the bottom of the can. On the other hand, sublimed white lead, being of lower specific gravity and having intense fineness, and being of a more amorphous structure, remains in suspension, as does also the zinc oxid. The fibrous magnesium silicate has the advantage of not only remaining in suspension itself, but of retaining the admixed pigments in suspension. The mechanism of this action is probably that the long, hairlike crystals of the asbestos interlace, very much like feathers in a pillow, thus "fluffing" the entire mix. By the employment of this mixture, the necessity of rendering the liquid portion viscous by the addition of injurious chemicals is avoided, and this is a matter of considerable importance, since the use of astringent or saponifying chemicals is a common practice among paint makers and it is well recognized that the result of the employment of such chemicals upon the durability of the paint coat is unqualifiedly deleterious.

One of the chief advantages of this systematized formula is, as I have discovered, that a paint made up of any given composition is limited, as to the maximum efficiency, to application within a narrow range of climatic conditions. Thus, if a paint containing sufficient zinc oxid to give a moderate hard coat is employed in an arid or even brilliantly sunlit climate, it will perish rapidly, by reason of the separation of the paint coat from the painted surface. On the other hand, if a paint containing so much of a lead compound as to give a soft paint surface is used in a damp climate, it will be rapidly permeated by moisture and gases, frequently to the destruction, beneath the coat, of the painted material. It is thus obvious that, for any mix of given ingredients, a certain proportion is best adapted for a particular climate, and it is the failure previously to observe these facts which has prevented mixed paints from being generally used by the master painters.

Without specifically limiting myself to the foregoing, I claim:

As an article of manufacture, in combination with a suitable paint vehicle, a major pigment of sublimed white lead, zinc oxid, fibrous magnesium silicate, and a fourth pigment crystalline in character and of rather obtuse angular formation, the proportion of zinc oxid being equal to or more than that of the fibrous magnesium silicate, and the proportion of fibrous magnesium silicate being somewhat greater than that of the fourth pigment, the chemical and physical properties of which adapt the paint for use in various climates and are adapted to exert a corrective influence upon one another by their use in different proportions.

MERRIWEATHER J. WAUGH.

Witnesses:
R. A. WARREN,
RAY C. HALL.